United States Patent [19]

Krieger et al.

[11] 4,212,196

[45] Jul. 15, 1980

[54] SINGLE BEAM TORQUE READOUT AND MULTIPLIER APPARATUS

[75] Inventors: Raymond L. Krieger, Denver; Ralph W. Weaver, Aurora; Edward T. Able, Denver, all of Colo.

[73] Assignee: B. K. Sweeney Manufacturing Company, Denver, Colo.

[21] Appl. No.: 956,401

[22] Filed: Oct. 31, 1978

[51] Int. Cl.[2] .............................................. G01L 5/24
[52] U.S. Cl. ..................................... 73/136 R; 73/139
[58] Field of Search .................... 73/1 C, 136 R, 139; 173/12

[56] References Cited

U.S. PATENT DOCUMENTS

| | | |
|---|---|---|
| 3,364,725 | 1/1968 | Grabovac .......................... 73/1 C |
| 3,538,763 | 11/1970 | Amtsberg et al. ................. 73/139 X |
| 4,060,137 | 11/1977 | Bickford et al. .................... 173/12 |

*Primary Examiner*—Charles A. Ruehl

*Attorney, Agent, or Firm*—Gary M. Polumbus

[57] ABSTRACT

Reaction torque between a drive shaft of a drive motor and the stationary housing of the drive motor is measured by apparatus which includes a torque readout meter and a torque multiplying arrangement. The apparatus includes a pivot sleeve member which is operatively connected to and pivots with the drive motor housing. A single deflection beam extends from the sleeve to the housing of the apparatus. The beam deflects when the sleeve pivots under the application of torque from the drive motor. The amount of deflection of the beam is operatively coupled to the torque readout meter where an indication of torque is registered. The torque readout meter includes a stay set feature to maintain the maximum readings after the applied torque is terminated. Two output shafts supply output torque. One output shaft applies multiplied torque and reduced rotational speed as compared to the other shaft which is directly connected to the drive motor.

12 Claims, 8 Drawing Figures

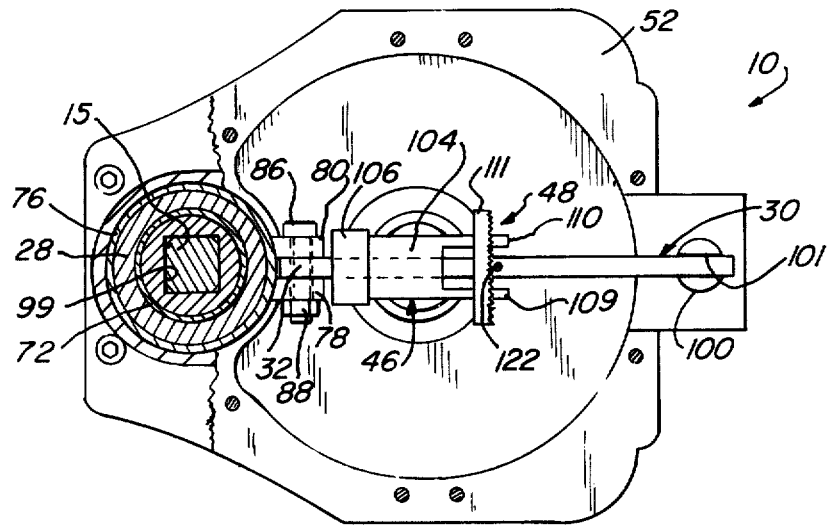
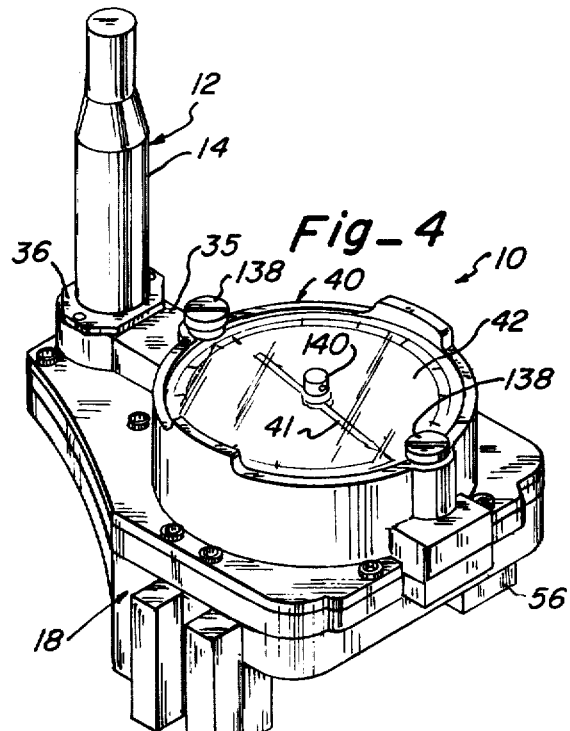
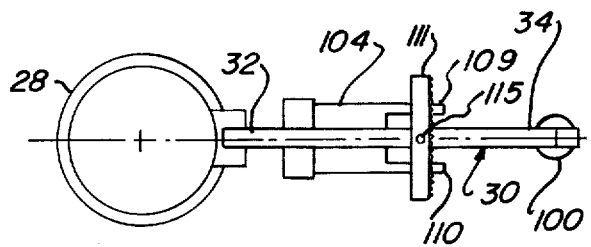
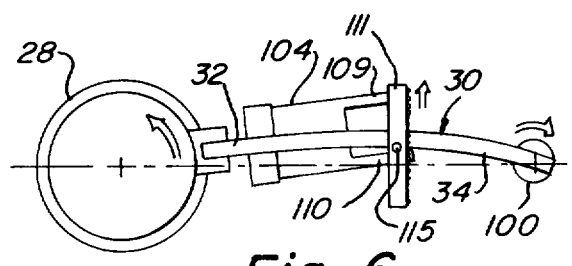
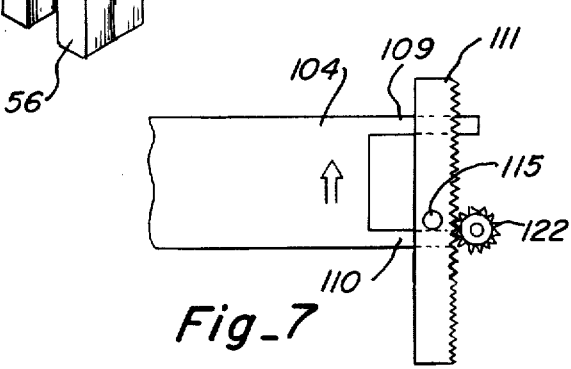
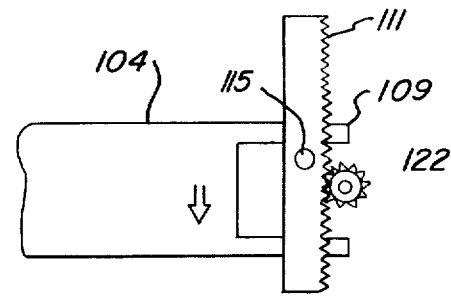

SINGLE BEAM TORQUE READOUT AND MULTIPLIER APPARATUS

BACKGROUND OF THE INVENTION

This invention relates to torque applying and measuring tools, such as those commonly employed in the maintenance of jet aircraft engines and other heavy equipment.

In many heavy equipment repair and maintenance situations, parts must be assembled to or disassembled from existing structures. Frequently, amount of torque or force required to assemble or remove the parts requires that a long-handled wrench be used, or in some situations, a drive motor or torque multiplying device or both must be used to obtain sufficient force to accomplish the maintenance or repair task. Frequently, the size of the existing structure does not allow sufficient room for use of a conventional long-handle wrench. It is a great convenience if, instead of using a wrench and human force, a mechanical drive motor can be employed. A mechanical drive motor can be employed in confined areas and greatly eases the human effort required.

Usually, specific amounts of torque must be applied to the nuts, bolts, or the like which hold the parts together. To effectively and safely repair or maintain these parts, it is necessary to know the amount of torque applied.

Significant features of apparatus and tools used in such situations are that the apparatus should readily connect with a drive motor, should be a relatively compact construction to fit within confined areas of existing structures, should provide a torque meter readout so that the user can safely and effectively assemble or disassemble parts, should secure high accuracy in the measurement of the torque and should provide torque multiplication to increase the usefulness and effectiveness of the apparatus. Other requirements, advantages and limitations are known or will become apparent to those skilled in the art.

SUMMARY OF THE INVENTION

The present invention relates to a single beam torque readout and multiplier apparatus. The apparatus is intended for use with a drive motor operated by hand or by external energy sources such as compressed air or electricity. The apparatus is arranged to apply rotating torque and to measure the torque applied. Measurement occurs by correlating the reaction torque between the rotating element and the stationary housing of the drive motor with the actual torque applied from one of two output shafts of the apparatus. An input shaft of the apparatus receives rotational energy from the drive motor, and a pivot sleeve means is operatively connected with the drive motor housing and senses reactions torque on the drive motor housing. Connecting means connect one output shaft for direction rotation with the input shaft and connect the other output shaft for speed reduction and torque multiplication. A deflection beam means biases the pivot sleeve means against pivoting from an initial position. In response to the reaction torque produced by the operating drive motor, the deflection means deflects or moves an amount which is related to the amount of torque applied by an output shaft. The movement of the deflection means operatively controls a torque readout meter of the apparatus. An indicator or pointer of the torque readout meter registers the maximum torque applied and stays set at the maximum reading after the applied torque is terminated.

The torque readout and multiplier assembly is conveniently and quickly used with a drive motor, such as a conventional hydraulic air motor. Construction of the preferred embodiment is relatively compact. The apparatus of the present invention further provides a multiplied torque output, and the torque readout meter is relatively easy to see and adjust. Other advantages and benefits of the present invention, as well as limitations in the prior art, can be more fully appreciated after referring to the following description of the preferred embodiment of the invention when taken in conjunction with the drawings briefly described below.

BRIEF DESCRIPTION OF THE DRAWINGS

FIG. 3 is a horizontal section view taken substantially in the plane of line 3—3 of FIG. 2.

FIG. 4 is a perspective view of assembled apparatus of the present invention, illustrating a rotating torque applying motor means attached to the single beam torque readout and multiplier assembly.

FIG. 5 is a generalized view schematically illustrating certain elements of the apparatus shown in FIG. 3.

FIG. 6 is a view similar to FIG. 5 illustrating operation of the elements shown.

FIG. 7 is an enlarged view of certain elements shown in FIG. 6.

FIG. 8 is a view similar to FIG. 7 illustrating the condition of elements after torque has been applied, measured and released.

DESCRIPTION OF PREFERRED EMBODIMENT

Figure 1:
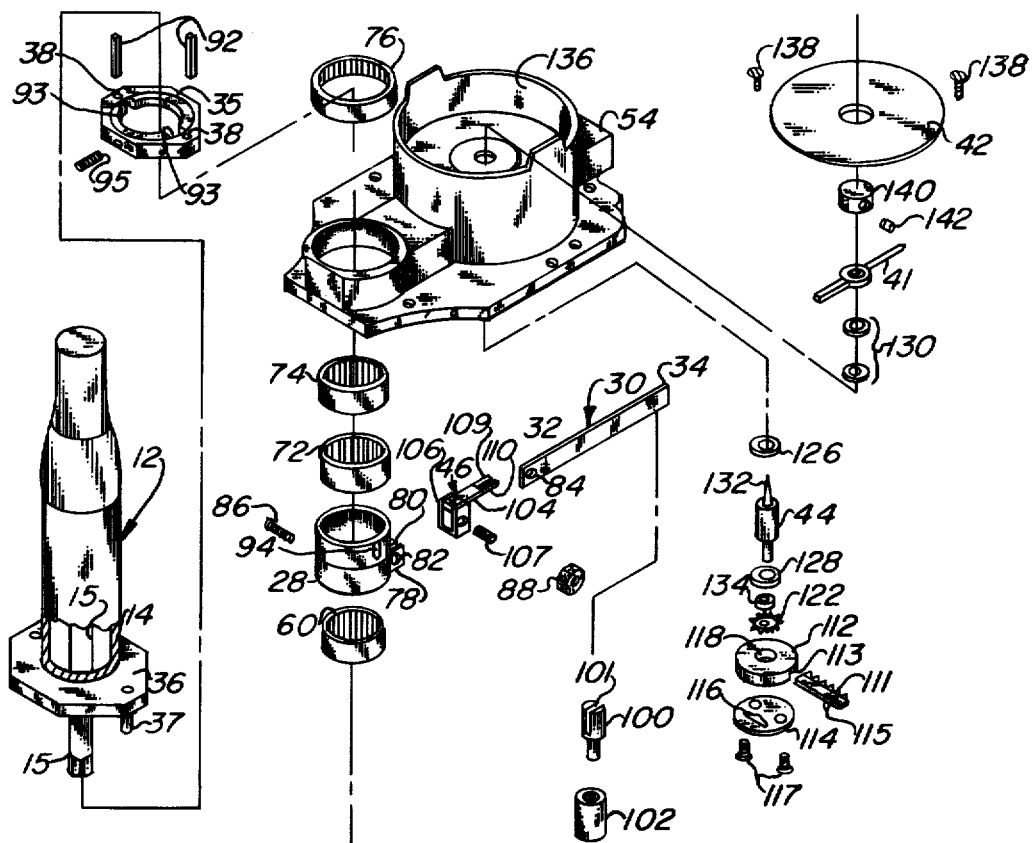
FIG. 1 is a perspective view of the single beam torque readout and multiplier assembly of the present invention illustrating the elements of the assembly in exploded relationship and also illustrating a drive motor means with a portion broken out to illustrate internal elements.
Figure 1:
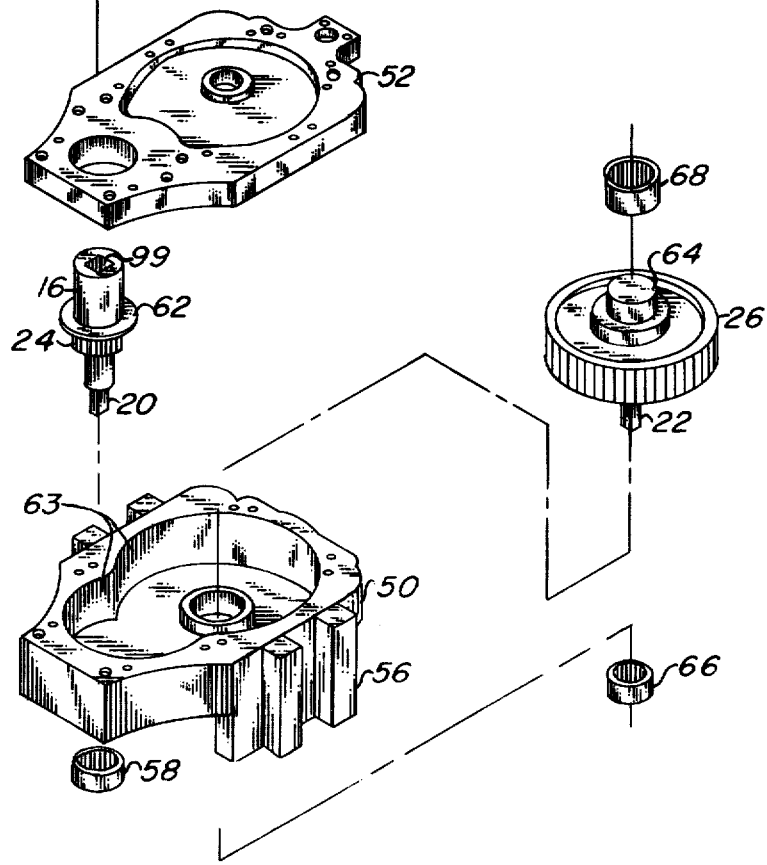

A single beam torque readout and multiplier apparatus 10 of the present invention is generally introduced by reference to FIGS. 1-4. A rotating torque-applying drive motor means such as a hydraulic air motor 12 is attached to the apparatus 10. The motor 12 is a conventional item having an exterior housing 14 and interior rotating drive shaft 15. The drive shaft 15 of the motor 12 is connected to rotate and apply torque to an input shaft 16 of the apparatus 10. The input shaft is mounted for rotation within a housing 18 of the apparatus 10. Two output shafts 20 and 22 are also mounted for rotation in the housing 18. The output shaft 20 is directly connected to rotate with the input shaft 16. The other output shaft 22 is operatively interconnected with the input shaft 16 by means of a speed reducing and torque multiplying gear set including a pinion gear 24 and an output gear 26. The pinion gear 24 is rigidly attached to the input shaft 16 and the output gear 26 is rigidly attached to the output shaft 22.

Pivot means such as a pivotable sleeve member 28 is also mounted to pivot or rotate slightly within the housing 18. The pivot sleeve member 28 is positioned essentially coaxially with respect to the input shaft 16. To operatively bias the pivot sleeve against pivoting an elongated rigid deflectable beam member 30 is connected at its first end 32 rigidly to the pivot sleeve member 28 and the other end 34 of the beam 30 is pivotably connected to the housing assembly 18. The beam 30 is thus connected to extend in a freely supported manner between the sleeve member 28 and the housing 18.

A drive motor plate 35 is one example of attaching means adapted for operatively selectively connecting the drive motor housing 14 to the pivot sleeve 28. The drive motor plate is rigidly connected to the end of the sleeve member 28 extending from the housing 18. A flange 36 formed on the exterior housing 14 of the air motor 12 is selectively connected to the drive plate 35 by fastening means such as projection studs 37. The projection studs are received in openings 38 of the drive motor plate 35 and operatively prevent rotation of the motor housing 14 relative to the pivot sleeve member 28.

In general operation, the air motor 12 develops energy and applies torque from its drive shaft 15 to the input shaft 16 of the apparatus. Torque is applied through one of the two output shafts 20 or 22 to an object to be rotated. The resistance to rotation created by the object creates a reaction torque which is coupled back to the air motor and is experienced between the rotating drive shaft 15 and the housing 14. Since the air motor housing 14 is operatively connected to the sleeve member 28, and since the drive shaft 15 of the air motor is directly connected to the input shaft 16, the reaction torque of the motor 12 is sensed between the input shaft 16 and the pivot sleeve member 28. The reaction torque is opposed by the beam member 30 which deflects under the application of reaction torque and thereby allows the pivot sleeve member to pivot slightly away from its initial position. The amount of beam deflection 30 is proportional to the reaction torque, and the reaction torque is proportional to the magnitude of actual torque applied to the object to be rotated.

A torque meter assembly 40 is attached to the housing 18 for the purpose of indicating the torque applied. The meter 40 includes an indicator or pointer 41, a marked scale 42, and a movable meter input means in the form of a rotatable meter input shaft member 44 connected for rotating the pointer 41 relative to the scale 42. Linkage means, in the form of a pusher projection member 46 and a rack and pinion gear assembly 48 (FIG. 2), operatively connect the beam 30 with the meter input shaft 44. The linkage means operatively transfer movement from the beam 30 as it deflects and applies the transferred movement to the torque readout assembly 40 to indicate torque. Since beam deflection is proportional to torque, the meter movement and meter indication are also directly related to the torque applied.

Further details of the construction and operation of the apparatus 10 follow.

Figure 2:
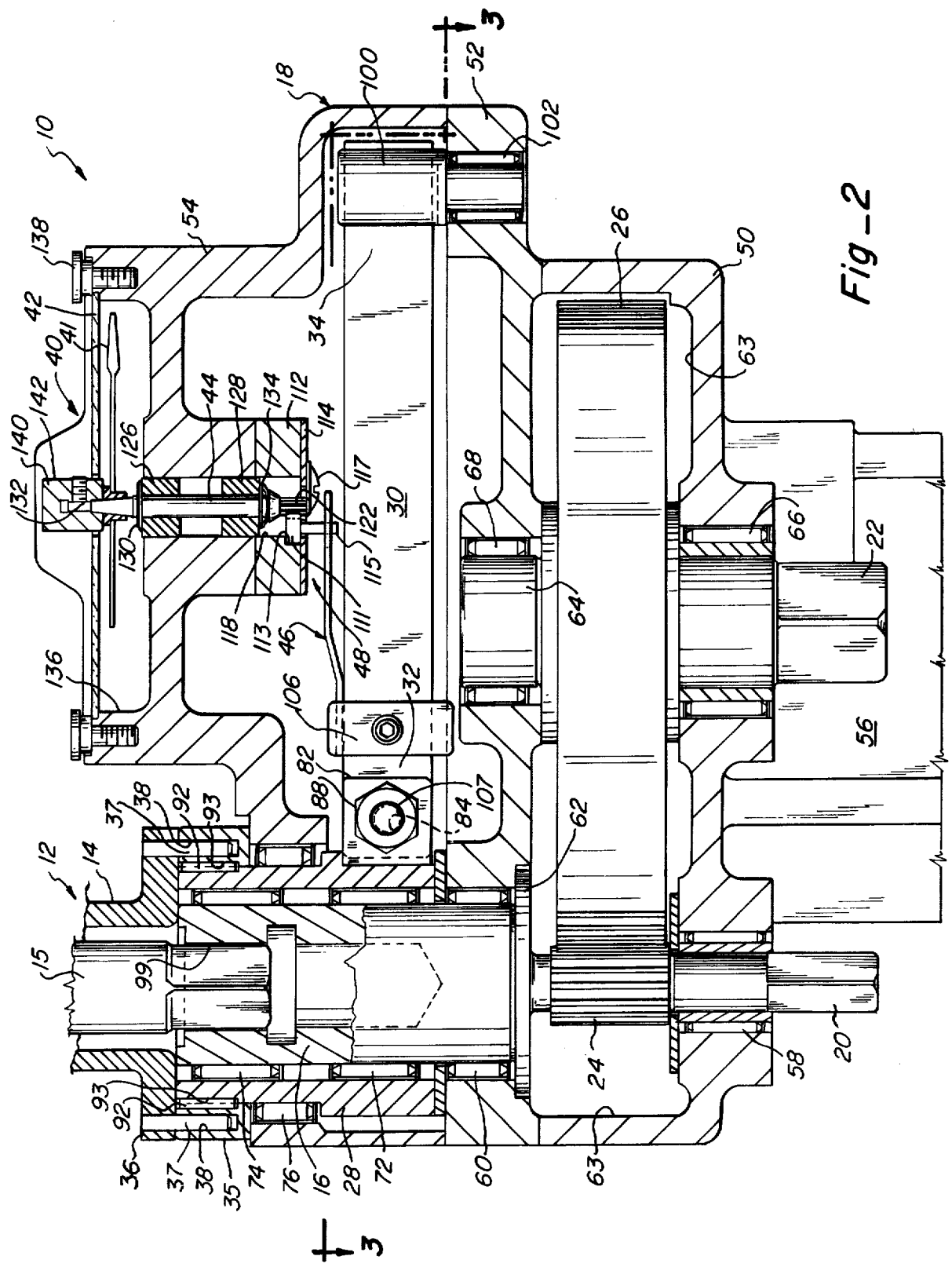
FIG. 2 is an enlarged vertical section view taken substantially through the apparatus of FIG. 1 when assembled. The section view of FIG. 2 is taken substantially in the plane of line 2—2 in FIG. 3.

Details of the housing assembly 18 are best seen in FIGS. 1 and 2. The housing assembly 18 is formed by a main housing member 50, and intermediate cover member 52, and a top cover member 54. The members 50–54 are preferably formed of cast aluminum and are joined together by suitable fastening means such as nuts and bolts as the various elements of the assembly 10 are assembled. The members 50–54 are arranged to contain and support the elements of the assembly 10. The assembly 10 is intended to be positioned upon or stacked in combination with another torque multiplier when used, as is typical in many aircraft maintenance operations.

To maintain the torque multiplier and readout assembly 10 in non-rotating relation with respect to another stacked machine tool or the like, a pair of oppositely spaced apart downward extending lugs 56 are formed on the main housing member 50. The lugs 56 contact sides of the tool used in combination with the apparatus 10 when one of the output shafts 20 or 22 applies rotating torque to the tool.

As shown in FIGS. 1 and 2, the input shaft 16 and the output shaft 20 are preferably formed as an integral unit. The pinion gear 24 is further formed as a portion of the integral shaft unit. The output shaft 20 is therefore directly interconnected for rotation with the shaft 16 by means of the integral construction. The integrally formed shaft unit is mounted for rotation in the housing assembly 18 by conventional needle bearing and race assemblies 58 and 60 respectively located within the main housing member 50 and within the interior cover 52. A flange 62 formed intermediate the input and output shafts 16 and 20 contacts the cover member 52 and prevents withdrawal of the integral shaft unit 16, 20 once the inner cover member 52 is permanently connected to the main housing member 50.

The speed reducing and torque multiplying arrangement formed by the pinion gear 24 and the output gear 26 is located and contained within an appropriate sized recess 63 formed in the main housing member 50 and covered by the intermediate cover member 52. The output shaft 22 and output gear 26 are also preferably formed as an integral unit, along with a shaft projection 64, extending coaxially on the opposite side of the output gear 26 from the output shaft 22. The output gear 26 is maintained in meshing rotational engagement with the pinion gear 24 by conventional needle bearing and race assemblies 66 and 68. The bearing assemblies 66 and 68 are respectively positioned in appropriate openings formed in the housing members 50 and 52. The recess 63 and attached intermediate cover member 52, form and define a reservoir into which lubricant for the gears 24 and 26 is placed. Seals (not shown) are utilized with the bearing assemblies 58, 60, 66 and 68 to prevent the escape of the lubricant from this reservoir.

The arrangement of the pinion gear 24 and the output gear 26 provides substantially multiplied torque at the output shaft 22 as compared to the torque available from the output shaft 20. The multiplied torque available as shaft 22 is useful in high force application situations. Thus, the apparatus 10 not only measures and indicates torque, but additionally serves as a torque multiplying device. The ends of the output shafts 20 and 22 are preferably formed in the square cross section. Sockets, or other appropriate tools, can be asserted over the square ends of the output shafts to deliver the rotating torque from the apparatus 10.

As is shown best in FIGS. 1 and 2, the pivot sleeve member 28 has cylindrically-shaped inner and outer surfaces. The pivot sleeve member 28 is received in the main housing member 50 in essentially coaxial relationship with respect to the input shaft 16. Conventional needle bearing and race assemblies 72 and 74 are positioned coaxially between the input shaft 16 and the pivot sleeve 28. A further conventional needle bearing and race assembly 76 is positioned intermediate the sleeve member 28 and the top cover member 54. By virtue of the bearing arrangement 72–76, the pivot sleeve is mounted for slight pivotable or rotational movement with respect to the input shaft 16 and the housing 18.

The pivot sleeve member 28 includes two spaced apart radially outward projecting tab members 78 and 80 (FIGS. 1 and 3) formed as an integral part of the sleeve member 28. The pair of tab members extends from the outer surface of the sleeve member and is adapted to receive the first end 32 of the deflection beam 30 therebetween. An opening 82 (FIG. 1) is formed through each of the tab members 78-80 and an opening 84 is formed through the first end of 32 of the beam member 30 at a position to be aligned with the opening 82. Fastening means in the form of a bolt 86 and nut 88 firmly and rigidly connect the end 32 of the beam between the tab members 78 and 80. Thus, the tabs 78-80, the openings 82-84, and the fastening means 86-88 define means for rigidly connecting the first end 32 of the beam member to the pivotable sleeve member 28. The beam 30 thus extends away from the sleeve member generally perpendicularly with respect to the axis about which the sleeve pivots.

To attach the housing 14 of the air motor to the sleeve, the motor drive plate 35 is rigidly connected at the outer end of the sleeve member 28 in exposed relation relative to the top cover member. Keys 92 are inserted into keyways 93 and 94 formed in radial alignment respectively in both the pivot sleeve 28 and motor drive plate 35, and serve as connection means to prevent rotation of the drive plate 35 relative to the pivot sleeve member 28. At least one set screw 95 holds the drive plate in connected relation on the sleeve member 28. Thus, the drive plate and sleeve member pivot or rotate together through the same angular arc.

The housing 14 of the air motor 12 includes the flange 36 which contacts and allows connection of the air motor housing to the motor drive plate 38. The pair of spaced apart projection studs 37 extend from the flange in alignment with openings 38 formed in the motor drive plate 35. The air motor 12 is selectively rigidly connected to the motor drive plate by insertion of the projection studs 37 into the openings 38. When attached, the drive shaft 15 of the air motor is connected to the input shaft 16 by means of an appropriate opening 99 formed in the input shaft 16 to receive the drive shaft 15. Consequently, the flange 36 abuts the motor drive plate 35 and projection studs 37 extend into the openings 38 to prevent rotation of the air motor housing relative to the motor drive plate and the sleeve member. As a result, reaction torque applied on the air motor housing by operation of the housing is coupled through the motor drive plate and pivotable sleeve member, and the pivotable sleeve member pivots the same amount as the reaction torque causes the air motor housing to pivot.

As previously described, the first end 32 of the beam 30 is rigidly connected to the sleeve member 28. The other or second end 34 of the beam 30 is pivotably attached to the housing 18 by means of a swivel post shaft 100, shown in FIGS. 1-3. A diametrically extending slot 101 is formed through the swivel post shaft 100 to slideably receive the end 34 of the beam. A conventional needle bearing and race assembly 102, pivotably connects the swivel post shaft into the intermediate cover member 52 of the housing assembly.

By rigidly connecting the first end 32 of the beam to the pivot sleeve member 28 and by pivotably connecting the second end 34 of the beam to the housing member, the beam member 30 is freely supported between its ends 32 and 34. The beam 30 biases the sleeve member to an initial position illustrated in FIG. 5. The amount of deflection of the beam is proportional to the amount of reaction torque present in the air motor. The amount of reaction torque is directly related to the amount of torque applied to the object to be rotated by the output shaft 20, and is inversely related by the amount of the torque multiplying gear ratio (26, 28) to the amount of the torque applied by the output shaft 22. The pusher member 46 and the rack and pinion gear assembly 48 (FIG. 2) couple movement of the deflecting beam 30 to the torque readout meter 40. The torque meter 40 provides an indication of the torque delivered to the object to be rotated. The scale 42 of the meter 40 is graduated to indicate torque applied from either of the output shafts 20 or 22.

Details of the torque readout meter 40 and the linkage means operatively connecting the meter 40 with the beam 30 are best seen in FIGS. 1-3 and 5-8. The pusher member 46 includes a projection or arm member 104. At one end of the arm 104 there is connected a U-shaped clamping member 106. The U-shaped clamping member is one example of means for attaching the arm 104 to the beam member 30 at a position adjacent the first beam end 32. The U-shaped clamping member fits around the beam and is held in position by a set screw 107. The other end of the arm 104 is bifurcated, having two transversely separated and spaced apart projections 109 and 110. When the beam is not deflected (FIG. 5), the attached arm 104 extends essentially parallel with and longitudinally along the beam 30. As the beam member deflects under the influence of torque (FIG. 6), the arm 104 pivots at an angle as the end 32 of the beam is bowed. The bifurcated end and projections 109-110 move transversely with respect to the longitudinal extension of the beam. The amount of transverse movement of the bifurcated pusher end is related to the amount of torque resisted by the beam.

The arm 104 extends essentially in parallel relation to a geometric tangent to the bowed beam end 32 at the attachment point of the clamping member 106. A greater amount of bowing occurs at points on the beam more closely spaced to the terminal beam end 32 and a lesser amount of bowing occurs at points more closely spaced to the center of the beam. By adjusting the position of the clamping member 106 along the beam adjacent the end 32, calibration between the torque applied and the torque indicated by the meter 40 is obtained.

Transverse movement of the bifurcated end of the pusher arm 104 operatively moves a rack gear 111 (FIG. 1) of the rack and pinion gear assembly 48. A rack attachment block member 112 has a channel 113 formed therein to receive and position the rack gear 111 for longitudinal movement. Longitudinal movement of the rack gear is essentially transverse with respect to the beam 30. The rack gear is held in a channel 113 by a washer 114. A downward extending tab 115 is formed on the rack gear. One of the projections 109 or 110 of the pusher arm 104 contacts the tab 115 and moves the rack longitudinally when the bifurcated end of the pusher arm 104 moves transversely as beam deflects. A transverse slot 116 is formed in the washer 114 to receive the downward projecting tab 115 and to allow longitudinal movement of the rack gear 111. Fastening means such as screws 117 extend through the washer 114, the attachment block 112 and into the top cover member 54 to attach the elements 111, 112 and 114 in assembled relation.

The shaft 44 of the torque meter 40 extends into an opening 118 in the attachment block 112. A pinion gear 122 of the rack and pinion gear assembly 48 is attached at the lower end of the shaft 44. The pinion gear 122 meshes with the rack gear 111. Upon longitudinal movement of the rack gear 111, the pinion gear 122 rotates the shaft 44 an amount proportional to the longitudinal movement of the rack gear 111. The rotating shaft 44 rotates the pointer of the torque meter 40, thus providing an indication of torque. The amount of rotation of pinion gear 122, the shaft 44, and the pointer 41 is related to the amount of torque applied, as determined by the amount of deflection of the beam 30.

The shaft 44 of the torque meter 40 is mounted for rotation in the top cover member 52 by bearing blocks 126 and 128. A snap ring and washer assembly 130 is attached to an end 132 of the shaft opposite the end to which the pinion gear 122 is attached. The snap ring and washer assembly 130 prevents axial movement of the shaft in one direction relative to the bearing block 126. At the end of the shaft 44 adjacent the pinion gear 122, a wave washer 134 applies a slight axial biasing force on the shaft 44. The axial biasing force is sufficient to prevent spurious rotational movement of the shaft 44 unless intentionally rotated.

The pointer 41 is preferably frictionally attached to the shaft end 132. Spaced above and axially outwardly from the pointer 41 is the meter scale 42. The meter scale 42 is transparent so that movement of the pointer 40 below the scale can be readily discerned. The scale 42 includes two graduations indicating torque. One graduation indicates torque applied by the directly driven output shaft 20 and the other graduation indicates torque applied by the torque multiplying gear arrangement 24 and 26 interconnected by the input shaft with output shaft 22. The scale 42 is rotatably received in a circular shaped opening 136 formed in the top cover member 54. Screws 138 hold the scale and when loosened, allow the scale to be rotated to a desired position. At the terminal shaft end 132, a knob member 140 is connected by a set screw 142. The knob 140 extends through the scale 42. The knob member can be rotated to rotate the shaft 44 and pointer 40. Some rotation of the shaft is allowed due to the space between the projections 109-110 on the bifurcated end of the pusher arm 104. The knob 140 and shaft 44 can be rotated until the tab 115 contacts one or the other of the projections 109-110. At the contact point of the tab 115 with a projection 109 or 110, the pointer 41 defines an initial or beginning position from which torque is measured. The scale 42 is then rotated so that the zero reading of both scale graduations is positioned immediately above the tip of the pointer 41. In this arrangement, the meter 40 is in a condition ready to measure torque.

In use, the apparatus is attached to an object to which rotational torque is to be applied. The knob member 140 is rotated to the initial beginning position moving the rack gear 111 and tab 115 until the tab contacts one or the other of the projections 109-110. This condition is illustrated in FIG. 7, with the tab 115 contacting the projection 109. The zero reading of the scale is aligned with the tip of the pointer 42. The air motor 12 is operatively connected with the pivot sleeve member 28 by insertion of its projection studs 37 into the openings 38 of the motor drive plate 35. The motor 12 is activated and the reaction torque between the rotating drive shaft 14 and the exterior housing 15 is sensed by pivoting of the pivot sleeve 28. The beam 30 deflects as shown in FIG. 6 and the bifurcated end of the pusher arm 104 deflects transversely. The projection 109 moves the tab 115 of the rack gear 111 longitudinally (upwardly in FIG. 6), and the rack gear 111 rotates the pinion gear 122. The rotating shaft 44 deflects the pointer 41 a predetermined amount related to the amount of torque applied, as sensed by the reaction torque of the motor. The amount of deflection of the pointer indicates the amount of torque applied, as determined by the scale graduations.

After torque has been applied and the force from the motor 12 is terminated, the pointer 41 maintains its maximum reading position. The space between the projection members 109-110 is sufficient so that the projection member 110 does not contact the tab 115 after torque is released and the beam and pusher arm return to the initial position, as shown in FIG. 8. Thus, when the pusher arm 104 returns to its initial position (FIG. 5), the tab 115 is intermediate the projections 109-110. The slight axial force from wave washer 134 maintains the pointer 41 at the maximum torque indication obtained. Thus, the wave washer 134 causes the pointer to stay set at the maximum amount of torque applied.

It should be noted that torque can be measured in either rotational direction. Rotating the knob 140 until the tab 115 contacts the one of the projection members 109-110 which will move the rack gear in the direction in accordance with the rotational direction of the applied torque allows measurement in either rotational direction.

The single beam torque readout and multiplier apparatus 10 of the present invention is of relatively compact construction, which allows it to be conveniently used in combination or association with other torque multipliers and apparatus and tools typically used in certain maintenance work such as aircraft engine repair. The compact construction allows the apparatus 10 to be inserted into relatively restricted areas and effectively utilized. Providing two output shafts for use depending upon the amount of torque multiplication required enhances the utility of the apparatus 10. The stay set feature of the torque readout meter is a convenience in measuring torque when the scale and pointer cannot be observed during actual use. Many other advantages and benefits of the apparatus are apparent to those skilled in the art.

A preferred embodiment of the present invention has been described with a degree of particularity. It should be understood, however, that the specificity of the present disclosure has been made by way of example, and that changes in details of features and construction and operation may be made without departing from the spirit of the invention.

What is claimed is:

1. A torque applying and readout apparatus adapted for applying rotational torque and for measuring the torque applied by a drive motor selectively attached to said apparatus, said apparatus operatively measuring the reaction torque between a rotating drive shaft and a housing of the drive motor, said apparatus further correlating the reaction torque to the torque applied by said apparatus and supplying an indication of the torque applied, said torque applying and readout apparatus comprising:

a housing;

an input shaft and an output shaft rotatably received by said housing;

means operatively interconnecting said input shaft and said output shaft for rotation;

means adapted for connecting the output shaft to an object to be rotated and to which rotational torque is applied;

pivot means pivotably attached to said housing;

deflection means operatively connected between said pivot means and said housing for biasing said pivot means against pivoting away from an initial position, said deflection means applying biasing force to said pivot means in predetermined magnitude related to the amount of pivoting of said pivot means away from the initial position, said deflection means comprising an elongated beam member having deflection characteristics and rigidly connected at one end to said pivot means and connected at the other end to said housing by means comprising a swivel post shaft pivotably attached to said housing and defining a slot extending therein, the slot receiving the other end of said beam member therein;

attaching means adapted for operatively connecting said pivot means to the housing of said drive motor, said attaching means operatively pivoting said pivoting means in predetermined relation to the magnitude of reaction torque between the housing and the drive shaft of said drive motor;

a torque meter assembly attached to said housing, said meter assembly including a meter input member for operating said assembly to indicate torque; and means operatively connecting said pivot means and the meter input member for operatively transferring movement from said pivot means to activate the meter input member of said meter assembly.

2. A torque applying and readout apparatus as defined in claim 1 wherein:

said pivot means comprises a sleeve member essentially coaxially received around said input shaft; and the elongated beam member is rigidly connected at said one end to said sleeve member and extends away from said sleeve member generally perpendicularly with respect to the axis about which said sleeve member pivots.

3. A torque applying and readout apparatus as defined in claim 2:

further comprising a first and a second output shaft each of which is rotatably received by said housing, and wherein said means for interconnecting the input and output shafts comprises means for directly connecting the input shaft with the first output shaft and for effecting a speed reduction and force multiplication from the input shaft to the second output shaft.

4. A torque applying and readout apparatus adapted for applying rotational torque and for measuring the torque applied by a drive motor selectively attached to said apparatus, said apparatus operatively measuring the reaction torque between a rotating drive shaft and a housing of the drive motor, said apparatus further correlating the reaction torque to the torque applied by said apparatus and supplying an indication of the torque applied, said torque applying and readout apparatus comprising:

a housing;

an input shaft and an output shaft rotatably received by said housing;

means operatively interconnecting said input shaft and said output shaft for rotation;

means adapted for connecting the output shaft to an object to be rotated and to which rotational torque is applied;

pivot means pivotably attached to said housing;

deflection means operatively connected between said pivot means and said housing for biasing said pivot means against pivoting away from an initial position, said deflection means applying biasing force to said pivot means in predetermined magnitude related to the amount of pivoting of said pivot means away from the initial position;

attaching means adapted for operatively connecting said pivot means to the housing of said drive motor, said attaching means operatively pivoting said pivoting means in predetermined relation to the magnitude of reaction torque between the housing and the drive shaft of said drive motor;

a torque meter assembly attached to said housing, said meter assembly including a rotatable meter input shaft for operating said assembly to indicate torque; and linkage means operatively connecting said pivot means and the meter input shaft for operatively transferring movement from said pivot means to the meter input shaft of said meter assembly, said linkage means comprises an elongated projection member rigidly attached to said deflection beam at a position to move upon deflection of said beam, and means operatively connecting the projection member for rotating the meter input shaft.

5. A torque applying and readout apparatus as recited in claim 4 wherein said means for connecting the projection member for rotating the meter input shaft comprises a meter gear assembly including a rack gear and a pinion gear, the meter pinion gear being attached to said meter input shaft, and the meter rack gear being operatively positioned by said housing to allow longitudinal movement and being operatively connected to said projection member.

6. A torque readout apparatus for indicating torque applied by a force applying apparatus, comprising in combination:

a housing;

an input shaft rotatably received within said housing and having an input means adapted to be rotated by the force applying apparatus;

a pivot sleeve member rotatably received within said housing in a position essentially coaxially with respect to the input shaft, said pivot sleeve member further including attaching means adapted for operatively connecting the pivot sleeve member with a portion of the force applying apparatus;

an elongated rigid deflectable beam member having first and second opposite ends connected respectively to the sleeve member and to the housing, said beam member extending in a freely supported manner within said housing between its connected ends;

a torque meter assembly attached to said housing and comprising a scale, an indicator operatively associated with the scale, a meter shaft attached to the indicator, a pinion gear attached to the meter shaft, a rack gear operatively attached for longitudinal movement relative to said housing and connected to mesh with the pinion gear, and a dependent tab member connected to said rack gear; and a pusher member operatively attached to said beam member at a position intermediate the first and second ends of said beam member, said pusher member further comprises an elongated projection arm having first and second oppositely spaced ends, the first end including means for rigidly attaching the projection arm to the beam member at a position adjacent the first end of said beam member, the means for rigidly attaching the projection arm to the beam member also positioning the projection arm to extend generally longitudinally along the beam member, the second end of said projection arm being bifurcated and defining spaced apart end portions, the spaced apart end portions of the second end of the pusher member receiving said tab member intermediate thereof.

7. A torque readout apparatus as recited in claim 6 wherein the first end of said projection arm is selectively connectable at adjustable positions along the first end of said beam member.

8. A torque readout apparatus as recited in claim 6 wherein:
said torque meter assembly further comprises a knob member connected to the meter shaft whereby rotation of the knob member rotates the meter shaft and indicator to a desired position.

9. A torque readout apparatus for indicating torque applied by a force applying apparatus, comprising in combination:
a housing;
an input shaft rotatably received within said housing and having an input means adapted to be rotated by the force applying apparatus;
a pivot sleeve member rotatably received within said housing in a position essentially coaxially with respect to the input shaft, said pivot sleeve member further including attaching means adapted for operatively connecting the pivot sleeve member with a portion of the force applying apparatus;
an elongated rigid deflectable beam member having first and second opposite ends connected respectively to the sleeve member and to the housing, said beam member extending in a freely supported manner within said housing between its connected ends, the second end of said beam member being connected to said housing by means comprising a swivel post shaft pivotably attached to said housing and defining a slot extending therein, the slot receiving the second end of said beam member therein;
a torque meter assembly attached to said housing and comprising a scale, an indicator operatively associated with the scale, and meter operating means for moving the indicator relative to the scale;
a pusher member operatively attached to said beam member at a position intermediate the first and second ends of said beam member; and
means operatively connecting said pusher member and the meter operating means of said torque meter assembly for applying deflection movement of said beam member to said meter operating means, thereby obtaining an indication of torque.

10. A torque readout apparatus as defined in claim 9 further comprising:
at least one output shaft operatively connected for rotation within said housing, said output shaft including means adapted for applying rotating torque to an object; and
means interconnecting said output shaft for rotation by said input shaft.

11. A torque readout apparatus as recited in claim 10 wherein said housing further comprises at least one lug member extending from said housing and adapted to contact other structure with which said torque readout assembly is utilized.

12. A torque applying and readout apparatus adapted for applying rotational torque and for measuring the torque applied by a drive motor selectively attached to said apparatus, said apparatus operatively measuring the reaction torque between a rotating drive shaft and a housing of the drive motor, said apparatus further correlating the reaction torque to the torque applied by said apparatus and supplying an indication of the torque applied, said torque applying and readout apparatus comprising:
a housing;
an input shaft rotatably received within said housing and having input means adapted to removably connect with and disconnect from the driver shaft of said drive motor;
at least one output shaft rotatably received by said housing;
means operatively interconnecting said input shaft and each said output shaft for rotation;
means associated with said output shaft and adapted for connecting said output shaft to an object to be rotated and to which torque is to be applied;
a pivot sleeve member rotatably received within said housing in a position essentially coaxially with respect to said input shaft;
a motor drive plate operatively attached to said pivot sleeve member to pivot in conjunction with the pivot sleeve member, said motor drive plate extending principally externally of said housing, said motor drive plate further defining at least two spaced-apart openings therein;
an elongated deflection beam operatively connected between said pivot sleeve member and said housing for biasing said pivot sleeve member against pivoting away from an initial position, said deflection beam having deflection characteristics for applying biasing force to said pivot sleeve member in predetermined magnitude related to the amount of pivoting of said pivot sleeve member away from the initial position;
a torque meter assembly attached to said housing and including means for indicating torque operatively applied by at least one of said output shafts;
means operatively connecting said pivot sleeve member and said torque meter assembly for translating movement of said pivot sleeve member into a signal applied to said torque indicating means; and
wherein said drive motor further includes a flange extending externally of the housing of said drive motor, and at least two projection studs rigidly connected to said flange at predetermined positions adapted to be aligned with and extend into the openings in said motor drive plate upon the selective attachment of the drive shaft of said drive motor to the input means of the input shaft of said torque applying and readout apparatus.

* * * * *